A. W. BURKE.
EXCESS WATTMETER.
APPLICATION FILED DEC. 4, 1915.

1,262,747.

Patented Apr. 16, 1918.

Inventor:
Alfred W. Burke
by Byrnes Townsend & Brickenstein
Att'ys.

though the variations in the line voltage

UNITED STATES PATENT OFFICE.

ALFRED W. BURKE, OF WILMINGTON, DELAWARE.

EXCESS-WATTMETER.

1,262,747.  Specification of Letters Patent.  Patented Apr. 16, 1918.

Application filed December 4, 1915. Serial No. 64,990.

*To all whom it may concern:*

Be it known that I, ALFRED W. BURKE, a subject of the King of Great Britain, residing at Wilmington, in the county of New Castle and State of Delaware, have invented certain new and useful Improvements in Excess-Wattmeters, of which the following is a specification.

This invention relates to recording watt-meters, such as are used on alternating current circuits, for recording the electrical energy consumed in excess of a certain predetermined quantity, and has for its object to provide means to automatically correct the error in watt-meters of this kind due to an increase or decrease in line voltage. The meter described in this application is an improvement on those described in my copending applications Serial No. 813,494, filed January 21, 1914, (now Patent No. 1,175,508, patented March 14, 1916;) Serial No. 11,484, filed March 2d, 1915; and Serial No. 46,974, filed August 23, 1915.

In the application Serial No. 11,484, above noted, a modification including a compensator is described, the purpose of which is to correct the error due to the fluctuation in line voltage, whereby the accuracy of the meter is considerably increased over that described in my Patent 1,175,508, above noted, the function of the compensator being to supply an electromotive force, and also a current, of as nearly as possible constant value, to neutralize or balance the potential at the terminals of, or to supply a magnetic flux in opposition to that of the current coil of the watt-meter, regardless of the variation in line voltage.

The compensator is a specially designed transformer, operating at above the magnetic saturation point of the iron core, whereby a substantially uniform potential is induced in its secondary, notwithstanding considerable variations in the line voltage.

In the application Serial No. 46,974, the function of the compensator is to correct the error due to variation in line voltage upon the voltage coil of the meter, this correction being effected by applying a neutralizing magnetic flux at an operative location in the meter, the neutralizing magnetic flux varying from zero when the line voltage is normal, to a variable plus or minus value corresponding directly to the variation in line voltage.

In the present application the compensator current is used to balance a predetermined current consumption, either by applying the compensator voltage to the terminals of the current coil, or by passing the compensator current through a solenoid or balancing coil, as described in my application Serial No. 11,484, above noted, and then applying to the compensator or balancing circuit a variable electromotive force equal and opposite in its effect to the variation of line voltage on the voltage coil of the meter; the source of the applied variable electromotive force may for convenience be called an "inverted booster," since it is in reversed connection with the compensator, and corresponds in effect to a variable load upon the compensator circuit, the load increasing and decreasing with an increase and decrease in line voltage, the quantity of the load corresponding to the effect of the variation in line voltage upon the voltage coil of the watt-meter, as above stated.

The compensator and the booster are so designed that by their combined action they neutralize a predetermined quantity of current in the current coil. As the potential across the booster changes it will variably draw current from the compensator. It will draw more current when the potential decreases and thus diminish the flow of current to the current coil. It will draw less current from the compensator when the potential increases and thus cause an increase of the flow of current to the current coil.

In the accompanying drawings:—

Figure 1:
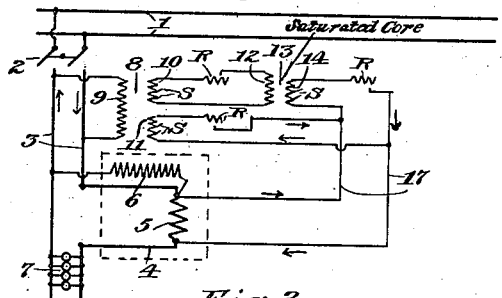
Figure 1 is a diagram of one form of connections showing the inverted booster connected to the compensator or balancing circuit, the compensator secondary being connected to the terminals of the watt-meter current coil.
Figure 5:
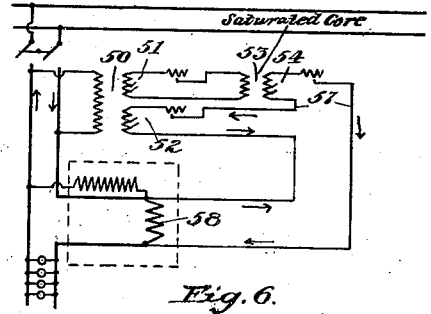
Figure 6:
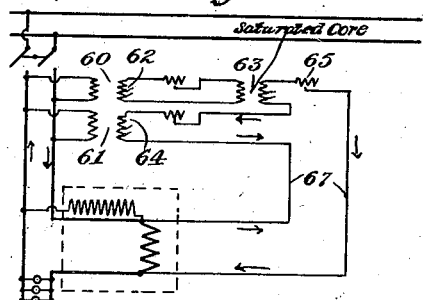
Figure 7:
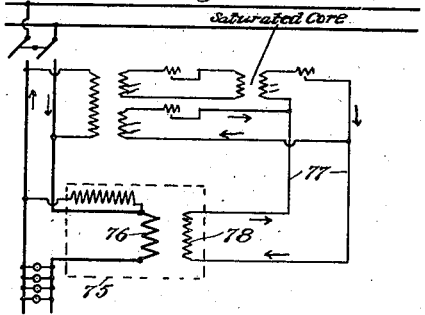
Figure 4:
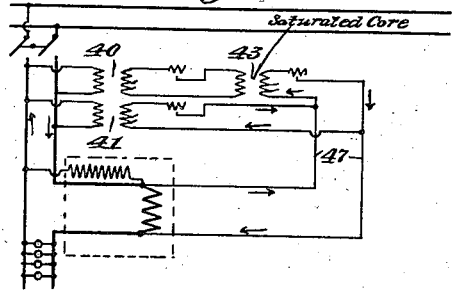
Fig. 4 is a diagram of a modification in which two separate transformers are provided, one supplying the compensator, and the other the inverted booster; this figure is otherwise the same as Fig. 1.
Figure 8:
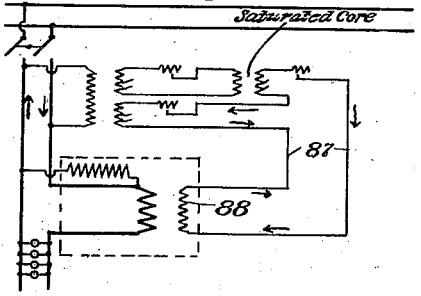

Figs. 5 and 6 resemble Figs. 1 and 4 in all respects, except that in Figs. 5 and 6 the inverted booster is connected in inverted series, instead of inverted parallel, as in Figs. 1 and 4; and Figs. 7 and 8 are diagrams resembling Figs. 1 and 5, except that the compensator or balancing circuits, instead of being connected to the terminals of the meter current coils, are connected to balancing coils placed in an operative location in the meter.

In Fig. 1, current from the service line 1 passes through the switch 2 to the house mains 3, from which it passes through the watt-meter 4 containing the current coil 5 and voltage coil 6, to the lamps or other translating devices 7. A transformer 8 provided with the primary 9 and secondaries 10, 11, is connected across the house mains as shown. Secondary coil 10 is connected to the primary 12 of compensator 13, the secondary 14 of the compensator being connected to the terminals of the current coil 5 in the watt-meter by the balancing circuit 17. The secondary 11 of transformer 8, which supplies the variable voltage, is connected in reversed parallel to the compensator or balancing circuit, as shown. The instantaneous direction of current in all the circuits is shown by the arrows. For convenience in adjusting the current and voltage to local conditions, taps S are provided on the secondaries 11 and 14, and resistances R, which may be of the inductive or non-inductive type, are connected in the circuits at convenient places.

Figure 2:
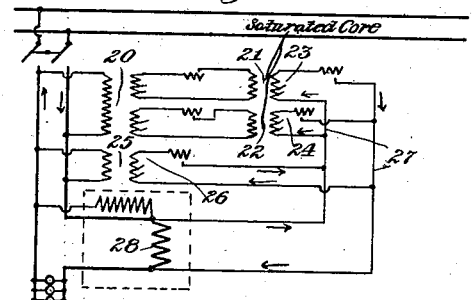
Fig. 2 is a diagram of a modification showing two compensators in multiple, and a separate primary for the inverted booster.

Fig. 2 resembles Fig. 1 in all respects, except that the two-secondary transformer 20 supplies two compensators, 21, 22, whose secondaries 23, 24, are connected in parallel; and also a separate transformer 25 is provided to supply, by its secondary 26, a variable voltage, the secondary 26 being connected in reversed parallel to the balancing circuit 27, as in Fig. 1, the circuit 27 being connected to the terminals of the meter current-coil 28.

Figure 3:
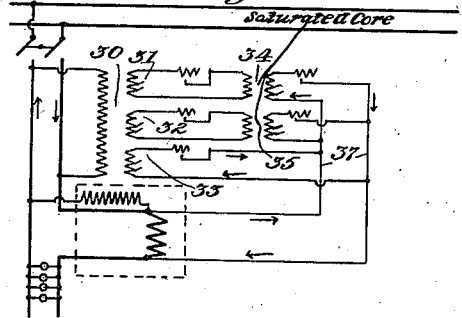
Fig. 3 is a diagram of a modification in which a transformer has one primary and three secondaries, the secondaries being connected as in Fig. 2.

Fig. 3 resembles Fig. 2 in all respects, except that a single transformer 30 is provided with three secondaries, 31, 32, 33; secondaries 31 and 32 supplying the compensators 34 and 35, while secondary 33 supplies the variable voltage and is connected in reversed parallel to the balancing circuit 37, as in Fig. 2.

Fig. 4 resembles Fig. 1, except that two transformers 40, 41 are provided instead of one at 8 in Fig. 1; transformer 40 supplying the compensator 43, and transformer 41 supplying the variable voltage which is connected in reversed parallel to the balancing circuit 47, as in Fig. 1.

Fig. 5 is a modification in which the secondary supplying the variable voltage is connected in reversed series, instead of reversed parallel, as shown in Fig. 1. The transformer 50 is provided with two secondaries 51, 52, secondary 51 supplying the compensator 53, while secondary 52 supplies the variable voltage, and is connected in reversed series with the secondary 54 of the compensator 53; the balancing circuit 57 being connected to the terminals of the current coil 58 of the watt-meter, as in Fig. 1.

Fig. 6 resembles Fig. 5 in all respects, except that two independent transformers 60, 61 are provided, the secondary 62 supplying the compensator 63, and the secondary 64 supplying the variable voltage, being connected in reversed series with the secondary 65 of compensator 63. The balancing circuit 67 is connected to the terminals of the meter current coil. In other respects the circuits are the same as in Fig. 5.

Fig. 7 resembles Fig. 1 in all respects, except that the balancing current circuit 77 is connected to a balancing coil 78, such as described in my Patent No. 1,175,508 and my prior application Serial No. 11,484, above noted, the balancing coil being in inductive connection with the current coil 76 and located in an operative position in the watt-meter 75 so as to neutralize a predetermined current strength in the current coil 76.

Fig. 8 resembles Fig. 5 in all respects except that, as in Fig. 7, the balancing current circuit 87 is connected to a balancing coil 88.

The operation of the meter is as follows, reference being made to Fig. 1. With all circuits properly adjusted by the voltage taps S and resistances R, and the main line voltage normal, and the predetermined current flowing in the house circuit, the watt-meter 4 does not register, since the compensator or balancing circuit 17 is so connected to the current coil 5 of the watt-meter as to neutralize and balance the current flowing through it consumed by the lamps, etc., 7, the voltage of the compensator secondary being adjusted so as to balance and neutralize the voltage at the terminals of the current coil 5 in the watt-meter. With an increase in the load on the house mains 3 the voltage at the terminals of the current coil 5 will increase due to the increased current in the house circuit, and the meter will accordingly register the increased current consumed, since the increase in voltage at the current coil due to the increase in the house current is not neutralized or balanced by the compensator voltage.

With normal voltage on the main line, the increased current consumed is recorded accurately, but with a variable line voltage an error is introduced proportional to and variable with the line voltage. With increased line voltage, the voltage coil 6 of the meter is supplied with an increased current, which causes the meter to register more than at normal line voltage with the same current consumption; with decreased line voltage, the meter registers less because the shunt coil is supplied with less current. To correct this error due to the variable line voltage on the voltage coil, an electromotive force, constituting an "inverted booster" and variable in the same proportion with the line voltage, is applied in reversed connection to the compensator or balancing circuit. The connections of the secondary 11 (the inverted booster) to the compensator or balancing circuit 17 are such that the secondary 11 in effect constitutes a load upon the compensator, the load varying with the voltage of secondary 11, and consequently varying with the line voltage. Since the compensator generates a substantially uniform voltage notwithstanding the variation in line voltage, its current in the circuit 17 with the meter coil 5 will be varied by the secondary coil 11 inversely as the voltage of the secondary coil 11 varies, and less current will be supplied to the current coil 5 with an increased main line voltage than with a decreased main line voltage. With a reduced current in circuit 17, upon an increase in line voltage, the potential difference at the terminals of the meter coil 5 due to the house current will send a portion of the current otherwise flowing through the meter coil 5 into the circuit 17, thereby reducing the current flowing through coil 5; this latter reduction corresponds exactly in its effect upon the meter to the increase in current in the voltage coil 6 due to the increased line voltage, and one neutralizes the other; the resultant effect of the two coils upon the watt-meter is therefore the same as if there had been no change in line voltage. With a decrease in the main line voltage, the reverse of these interactions takes place, the meter registering normal for a given load.

The operation in the case of Fig. 2 is the same as with Fig. 1, except that the current from the compensator secondary 24 is normally balanced by the "inverted booster" 26 current, leaving the other compensator secondary 23 free to neutralize the current coil 28 of the watt-meter. With increasing line voltage, a corresponding portion of the current from the free compensator secondary 23 is balanced by the increased voltage from the inverted booster 26; and with decreasing line voltage a corresponding portion of the normally balanced compensator secondary 24 is left unbalanced by the decreased voltage of the inverted booster 26, the balancing current in circuit 27 supplied to the meter current coil 28 therefore varies inversely as the voltage on the main line, and the meter is affected thereby, as described under Fig. 1.

The operation in the case of Figs. 3 and 4 resembles that of Figs. 2 and 1, respectively, there being no change, except as indicated above, in the primary coil of the transformer 30 of Fig. 3, and separate primaries for the transformers 40, 41 of Fig. 4, instead of a single primary, as in Fig. 1.

The operation in the case of Figs. 5 and 6, where the inverted boosters are in series with the compensator secondaries, is the same as with Figs. 1 and 4, respectively, a variable inverted booster voltage causing a variable compensator current; with increased booster voltage, a decreased compensator current results, and vice versa. The current coils of the watt-meters are affected thereby, as described under Fig. 1.

In Figs. 7 and 8, the corrected compensator currents pass through suitable balancing coils 78, 88, such as is described in my prior applications Serial Nos. 813,494 (now Patent No. 1,175,508, patented March 14, 1916) and 11,484, above noted. Each balancing coil is suitably placed in the meter in an operative location, and magnetically neutralizes and balances the effect of a predetermined current strength in the series coil of the watt-meter; any current consumed over and above the predetermined amount actuating the meter.

While I have shown some specific ways for carrying out the object of my invention, it is obvious that the inventive idea may be executed in other ways. The principal idea is the application of a booster in a compensator of the character involved and their combined action may be caused to react on the current coil in various ways without going outside the scope of the invention.

I claim:—

1. In an apparatus for measuring electric currents, the combination of a watt-meter, a compensator, a balancing circuit, said compensator connected to said balancing circuit, means connected to said balancing circuit to automatically decrease the current strength in said circuit as the line voltage increases above normal, and to increase said current strength as the line voltage decreases below normal.

2. In an apparatus for measuring electric currents, the combination of a watt-meter, a compensator, a booster, a balancing circuit, said compensator and booster connected to said balancing circuit, said booster connected in reverse order to said compensator.

3. In an apparatus for measuring electric currents, the combination of a watt-meter, a current coil therein, a compensator, a booster, a balancing circuit, said compensator and booster connected to said balancing circuit, said booster connected in reverse order to said compensator, said balancing circuit connected to said current coil.

4. In an apparatus for measuring electric currents, the combination of a watt-meter, a current coil therein, a transformer, a compensator, a booster, a balancing circuit, said compensator and booster connected to said balancing circuit, means to adjust the strength of the compensator and booster currents, said booster connected in reverse order to said compensator, and said balancing circuit connected to said current coil.

5. In an apparatus for measuring electric currents, the combination of a watt-meter, a series coil therein, a compensator, a booster, a balancing circuit, said compensator and booster connected to said balancing circuit, said booster connected in reverse order to said compensator, a balancing coil, said balancing circuit connected to said balancing coil, said balancing coil located so as to neutralize said series coil in its effects upon the meter.

6. The method of measuring electric current employing a meter having a current coil and a voltage coil which comprises passing the current to be measured through the current coil, applying to said current coil a normally constant balancing current, decreasing said balancing current as the main line voltage increases above normal, and increasing said balancing current as the main line voltage decreases below normal.

7. In an apparatus for measuring electrical energy, comprising a current coil and a voltage coil, a circuit designed to produce a constant current flow in the current coil and a booster in said circuit designed to increase and decrease said current flow through the current coil when the line voltage is decreased and increased, respectively, the circuit and booster being so adjusted that by their combined action they neutralize in the meter a fixed quantity of electrical energy.

8. In an apparatus for measuring electrical energy, comprising a current coil and a voltage coil, a circuit operatively associated with the said current coil to cause a constant current flow in the current coil in opposition to the normal meter current and means acting on the said circuit in opposition to the action of the current flowing therein to proportionately increase and decrease the current as the line voltage decreases and increases, respectively above and below normal.

9. In an apparatus for measuring electrical energy, comprising a current coil and a voltage coil, a compensating system acting on the current coil in opposition to the action of the normal meter current flowing therethrough, said compensating system comprising means for producing a constant current and means responsive to the fluctuations of the line voltage adapted to increase and decrease said current as the line voltage decreases and increases, respectively above and below normal.

In testimony whereof I affix my signature in presence of two witnesses.

ALFRED W. BURKE.

Witnesses:
RUTH M. THAWLEY,
EMMA SBRITSKY.